(12) United States Patent
Pan et al.

(10) Patent No.: US 11,436,604 B2
(45) Date of Patent: Sep. 6, 2022

(54) METHOD, APPARATUS AND STORAGE MEDIUM FOR PROCESSING ETHEREUM-BASED FALSIFIED TRANSACTION

(71) Applicant: BEIJING BAIDU NETCOM SCIENCE AND TECHNOLOGY CO., LTD., Beijing (CN)

(72) Inventors: Siyuan Pan, Beijing (CN); Haodong Chen, Beijing (CN); Hongbin Mao, Beijing (CN); Yuxiao Song, Beijing (CN); Hang Zhou, Beijing (CN); Hui Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 405 days.

(21) Appl. No.: 16/691,094

(22) Filed: Nov. 21, 2019

(65) Prior Publication Data
US 2020/0311735 A1    Oct. 1, 2020

(30) Foreign Application Priority Data
Mar. 26, 2019  (CN) .......................... 201910234038.8

(51) Int. Cl.
*H04L 9/06*    (2006.01)
*G06Q 20/40*    (2012.01)
(Continued)

(52) U.S. Cl.
CPC ..... *G06Q 20/4016* (2013.01); *G06Q 20/0658* (2013.01); *G06Q 20/3674* (2013.01); *H04L 9/0637* (2013.01)

(58) Field of Classification Search
CPC . G06F 16/23; G06F 20/40; H04L 9/32; H04L 12/18
See application file for complete search history.

(56) References Cited

U.S. PATENT DOCUMENTS

2018/0157583 A1*  6/2018  Bache ................. G06F 11/3676

FOREIGN PATENT DOCUMENTS

| JP | 2017-207979 A | 11/2017 |
|---|---|---|
| KR | 10-2016-0139914 A | 12/2016 |

(Continued)

OTHER PUBLICATIONS

Korean Notice of Allowance for Korean Application No. 10-2019-0151294, dated Aug. 30, 2021, 3 pages.

*Primary Examiner* — Patrick McAtee
*Assistant Examiner* — Nakia Leffall-Allen
(74) *Attorney, Agent, or Firm* — Seed IP Law Group LLP

(57) ABSTRACT

Embodiments of the present disclosure relate to the field of blockchain technology, disclose a method, apparatus, and storage medium for processing an ethereum-based falsified transaction, and solve the problem of the existing technologies failing to achieve validating falsification resistance of an ethereum consensus algorithm in engineering. The method includes: sending a falsified transaction to a preset node of in ethereum network, such that the preset node broadcasts a block including the falsified transaction to all nodes in the ethereum network; and determining whether the falsified transaction successfully attacks the ethereum network based on information on a chain maintained by a node in the ethereum network. The embodiments of the present disclosure apply to the process of validating the falsification attack resistance of the ethereum network consensus algorithm.

7 Claims, 3 Drawing Sheets

Sending a falsified transaction to a preset node in an ethereum network, such that the preset node broadcasts a block including the falsified transaction to all nodes in the ethereum network — 101

Determining whether the falsified transaction successfully attacks the ethereum network based on information on a chain maintained by the node in the ethereum network — 102

(51) Int. Cl.
*G06Q 20/06* (2012.01)
*G06Q 20/36* (2012.01)

(56) References Cited

FOREIGN PATENT DOCUMENTS

| | | | |
|---|---|---|---|
| KR | 10-2019-0023894 A | 3/2019 | |
| KR | 10-1761512 B1 | 7/2019 | |
| WO | WO-2017148527 A1 * | 9/2017 | ......... G06Q 10/0833 |
| WO | 2018/154713 A1 | 8/2018 | |
| WO | 2018/066362 A1 | 12/2018 | |
| WO | WO-2019142049 A1 * | 7/2019 | ........... G06F 16/137 |

* cited by examiner

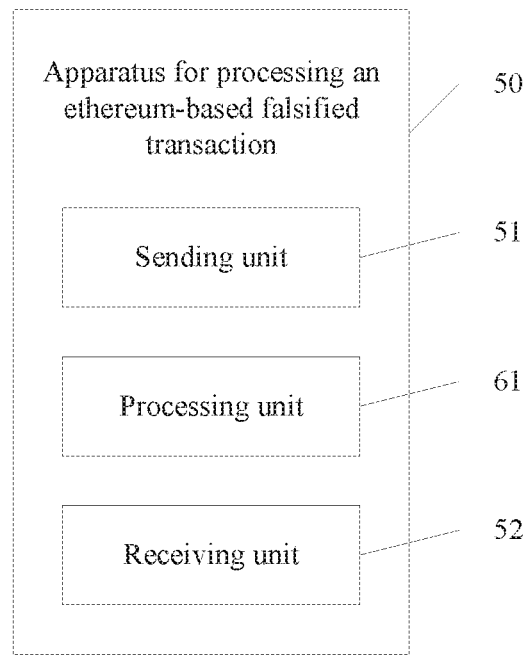

METHOD, APPARATUS AND STORAGE MEDIUM FOR PROCESSING ETHEREUM-BASED FALSIFIED TRANSACTION

CROSS-REFERENCE TO RELATED APPLICATIONS

This application claims priority to Chinese Patent Application No. 201910234038.8, filed on Mar. 26, 2019, titled "Method, Apparatus and Storage Medium for Processing Ethereum-Based Falsified Transaction," which is hereby incorporated by reference in its entirety.

TECHNICAL FIELD

Embodiments of the present disclosure relate to the field of blockchain technology, and in particular to, a method, apparatus, and storage medium for processing an ethereum-based falsified transaction.

BACKGROUND

The blockchain technology is a technology with which a consensus is reached among a plurality of mutually distrusting participants, and the ethereum is an implementation applying the blockchain technology. With the ethereum, the plurality of participants can jointly maintain a given blockchain, such that the participants reach a consensus on transactions on the given chain, and none of the participants can change the transactions on the chain without authorization.

In order to achieve the consensus on a blockchain, blockchain researchers have designed a plurality of consensus algorithms, such as earliest POW, later POS, and POA. Different consensus algorithms have different properties, but have identical basic goal, i.e., reaching a consensus. Integrity and non-repudiation of the transactions are key performances to be considered by each consensus algorithm. For the integrity of the transactions, the consensus algorithm must guarantee that the transaction entering the blockchain is always intact, and cannot be changed by any participant without authorization. For the non-repudiation, the consensus algorithm must guarantee that the transactions entering the blockchain cannot be repudiated or withdrawn by any participant without authorization.

The falsification resistance in the existing technologies is validated from the perspective of arithmetical operation with less implementation in practical engineering.

SUMMARY

An object of the present disclosure includes to solve the problem of the existing technologies failing to validate falsification resistance of an ethereum consensus algorithm in engineering, providing a method, apparatus, and storage medium for processing an ethereum-based falsified transaction, which sends a falsified transaction to a set node in an ethereum network to form a "bad node," broadcasts a block including the falsified transaction to all nodes in the ethereum network via the bad node, views whether a normal node in the ethereum network accepts the block including the falsified transaction, and then validates the falsification resistance of the consensus algorithm of the ethereum network.

In order to achieve the above object, in a first aspect, an embodiment the present disclosure provides a method for processing an ethereum-based falsified transaction, including: sending a falsified transaction to a preset node in an ethereum network, such that the preset node broadcasts a block including the falsified transaction to all nodes in the ethereum network; and determining whether the falsified transaction successfully attacks the ethereum network based on information on a chain maintained by the node in the ethereum network.

Further, the determining whether the falsified transaction successfully attacks the ethereum network based on information on a chain maintained by the node in the ethereum network includes: sending requests for acquiring block information to the preset node and a non-set node in the ethereum network respectively, the requests for acquiring block information being configured for acquiring a last piece of block information on the chain maintained by the node; receiving a first piece of block information returned by the preset node and a second piece of block information returned by the non-set node, and comparing header information of the first piece of block information with header information of the second piece of block information to determine whether the header information of the first piece of block information is identical to the header information of the second piece of block information; determining the falsified transaction successfully attacking the ethereum network, when the header information of the first piece of block information is identical to the header information of the second piece of block information; and determining the falsified transaction failing to attack the ethereum network, when the header information of the first piece of block information is different from the header information of the second piece of block information.

Further, the determining whether the falsified transaction successfully attacks the ethereum network based on information on a chain maintained by the node in the ethereum network includes: sending a transaction information request to the non-set node in the ethereum network, the transaction information request including an identifier of the falsified transaction; receiving a response message returned by the non-set node, and viewing whether the response message includes information of the falsified transaction; determining the falsified transaction successfully attacking the ethereum network, when the response message includes the information of the falsified transaction; and determining the falsified transaction failing to attack the ethereum network, when the response message does not include the information of the falsified transaction.

In a second aspect, an embodiment of the present disclosure provides a method for processing an ethereum-based falsified transaction, including: receiving a falsified transaction, and packing the falsified transaction into a block to obtain a block including the falsified transaction; and broadcasting the obtained block to all nodes in an ethereum network where a present node broadcasting the obtained block is located, to determine whether the falsified transaction successfully attacks the ethereum network based on information on a chain maintained by the node in the ethereum network.

Further, after the receiving a falsified transaction, the method further includes: broadcasting the falsified transaction to a preset node in the ethereum network.

Further, after the broadcasting the obtained block to all nodes in an ethereum network where a present node broadcasting the obtained block is located, the method further includes: receiving a block broadcasted to the present node, and acquiring transaction information in the received block; determining whether the transaction information in the received block is included in the transaction information on the chain maintained by the present node; discarding the received block when the transaction information in the block is included in the transaction information on the chain maintained by the present node; acquiring header signature in the received block when the transaction information in the received block is not included in the transaction information on the chain maintained by the present node; determining whether a node identifier in the header signature is included in a preset node identifier; and incorporating the received block onto the chain maintained by the present node, when the node identifier in the header signature is included in the preset node identifier.

In a third aspect, an embodiment the present disclosure provides an apparatus for processing an ethereum-based falsified transaction, including: a sending unit configured to send a falsified transaction to a preset node in an ethereum network, such that the preset node broadcasts a block including the falsified transaction to all nodes in the ethereum network; and a processing unit configured to determine whether the falsified transaction successfully attacks the ethereum network based on information on a chain maintained by the node in the ethereum network.

Further, the sending unit is further configured to send requests for acquiring block information to the preset node and a non-set node in the ethereum network respectively, the requests for acquiring block information being configured for acquiring a last piece of block information on the chain maintained by the node; the apparatus further includes: a receiving unit configured to receive a first piece of block information returned by the preset node and a second piece of block information returned by the non-set node; and the processing unit is further configured to compare header information of the first piece of block information with header information of the second piece of block information to determine whether the header information of the first piece of block information is identical to the header information of the second piece of block information; determine the falsified transaction successfully attacking the ethereum network, when the header information of the first piece of block information is identical to the header information of the second piece of block information; and determine the falsified transaction failing to attack the ethereum network, when the header information of the first piece of block information is different from the header information of the second piece of block information.

Further, the sending unit is further configured to send a transaction information request to the non-set node in the ethereum network, the transaction information request including an identifier of the falsified transaction; the apparatus further includes: a receiving unit configured to receive a response message returned by the non-set node; and the processing unit is further configured to view whether the response message includes information of the falsified transaction; determine the falsified transaction successfully attacking the ethereum network, when the response message includes the information of the falsified transaction; and determine the falsified transaction failing to attack the ethereum network, when the response message does not include the information of the falsified transaction.

In a fourth aspect, an embodiment of the present disclosure provides an apparatus for processing an ethereum-based falsified transaction, including: a receiving unit configured to receive a falsified transaction; a processing unit configured to pack the falsified transaction into a block to obtain a block including the falsified transaction; and a sending unit configured to broadcast the obtained block to all nodes in an ethereum network where a present node broadcasting the obtained block is located, to determine whether the falsified transaction successfully attacks the ethereum network based on information on a chain maintained by the node in the ethereum network.

Further, the sending unit is further configured to broadcast the falsified transaction to a preset node in the ethereum network.

Further, the receiving unit is further configured to receive a block broadcasted to the present node, and acquire transaction information in the received block; and the processing unit is further configured to determine whether the transaction information in the block is included in the transaction information on the chain maintained by the present node; discard the received block when the transaction information in the received block is included in the transaction information on the chain maintained by the present node; acquire header signature in the received block when the transaction information in the received block is not included in the transaction information on the chain maintained by the present node; determine whether a node identifier in the header signature is included in a preset node identifier; and incorporate the received block onto the chain maintained by the present node, when the node identifier in the header signature is present in the preset node identifier.

In a fifth aspect, an embodiment of the present disclosure provides a storage medium, storing an instruction, the instruction, when executed on a computer, causing the computer to execute at least one of the method for processing an ethereum-based falsified transaction according to the embodiments in the first aspect, or the method for processing an ethereum-based falsified transaction according to the embodiments in the second aspect.

The above technical solutions send a falsified transaction using a preset node, i.e., a "bad node," thus simulating the effect of falsifying and attacking chain data using the falsified transaction by the "bad node," and then viewing whether the falsified transaction can be accepted by a "normal node," i.e., a non-set node, thereby achieving validating falsification resistance of consensus algorithm in engineering.

Other features and advantages of the present disclosure will be described in detail in subsequent embodiments.

BRIEF DESCRIPTION OF THE DRAWINGS

The accompanying drawings are used for providing further understanding of the present disclosure, constitute an integral part of the specification, and are used for interpreting the present disclosure together with the embodiments below, but do not impose any limitation on the present disclosure. In the accompanying drawings:

FIG. 6 is a schematic structural diagram of another apparatus for processing an ethereum-based falsified transaction according to an embodiment of the present disclosure; and FIG. 7 is a schematic structural diagram of still another apparatus for processing an ethereum-based falsified transaction according to an embodiment of the present disclosure.

DETAILED DESCRIPTION OF EMBODIMENTS

The embodiments of the present disclosure will be described in detail below in combination with the accompanying drawings. It should be understood that the embodiments described herein are only used to illustrate and explain the present disclosure, and are not intended to limit the present disclosure.

Figure 1:
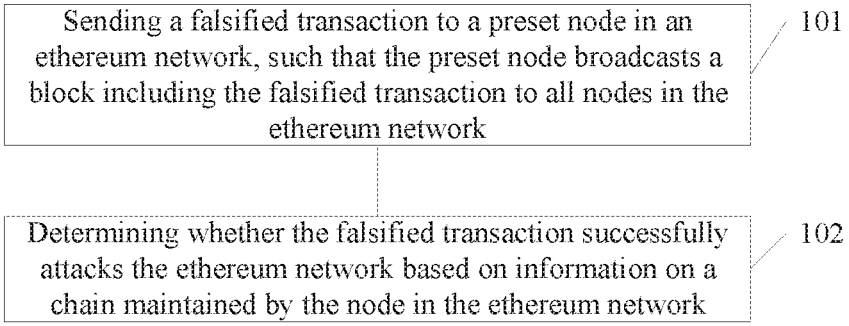
FIG. 1 is a schematic flowchart of a method for processing an ethereum-based falsified transaction according to an embodiment of the present disclosure.

FIG. 1 is a schematic flowchart of a method for processing an ethereum-based falsified transaction according to an embodiment of the present disclosure. As shown in FIG. 1, the method includes steps 101 and 102.

Step 101: sending a falsified transaction to a preset node in an ethereum network, such that the preset node broadcasts a block including the falsified transaction to all nodes in the ethereum network.

Step 102: determining whether the falsified transaction successfully attacks the ethereum network based on information on a chain maintained by the node in the ethereum network.

A blockchain does not independently store block information on the chain, and obtains all block information through transaction processing. Therefore, for falsification of the block information on the chain, a to-be-falsified object is a transaction on the chain. A legitimate transaction itself must pass signature validation. Therefore, in the validation method, the transactions are divided into two types: a common transaction and a falsified transaction, where the common transaction may be included in a block of any node, while the falsified transaction can only be included in a block generated by a so-called "bad node." Therefore, in order to simulate the falsified transaction meeting the above requirements, a "bad node," i.e., the preset node, is pre-established in the ethereum network. Then, the falsified transaction is sent to the preset node, i.e., the "bad node" of the ethereum network, and cannot be sent to a normal node, i.e., a non-set node, thus stimulating the falsified transaction merely visible to the "bad node," such that the preset node packs the falsified transaction into a block to obtain a block including the falsified transaction, and broadcasts the block generated by the preset node with the falsified transaction to all nodes in the ethereum network.

Figure 2:
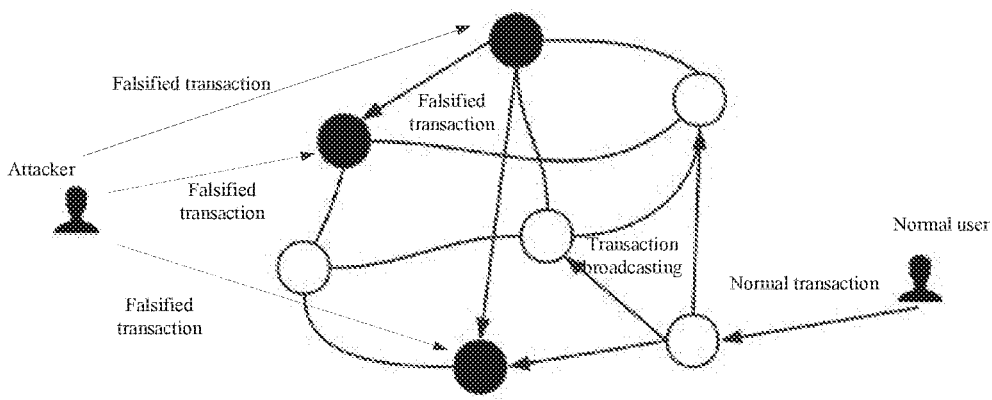
FIG. 2 is a schematic diagram of transaction propagation of an ethereum network according to an embodiment of the present disclosure.

In an embodiment of the present disclosure, in an ethereum network shown in FIG. 2, a black node denotes a preset node, i.e., a "bad node," controlled by an "attacker," while a white node denotes a normal node. When sending a falsified transaction to a preset node of the ethereum network, the falsified transaction may be sent to the preset node, and then broadcasted by the preset node to other preset nodes, or the falsified transaction may be sent directly to all preset nodes in the ethereum network. The ultimate effect obtained from whichever implementation is to simulate that only the preset node can broadcast a block including the falsified transaction. In addition, as shown in FIG. 2, a normal transaction initiated by a normal user is equally broadcasted to the preset node and an undefined node. Thus, the normal transaction and the falsified transaction can be queried in a txpool of the preset node, while merely the normal transaction can be queried in a txpool of the non-set node, and the falsified transaction cannot be queried in the txpool of the non-set node, thus simulating the effect of the falsified transaction generated by the preset node, i.e., the bad node.

Then, whether the falsified transaction successfully attacks the ethereum network may be determined based on information on a chain maintained by a node in the ethereum network.

Whether the falsified transaction successfully attacks the ethereum network may be determined by two approaches. The first approach is to compare a last piece of block information on a chain maintained by the preset node with a last piece of block information on a chain maintained by the non-set node. Header information of block information on a chain maintained by each node includes a hash value of an immediate prior piece of header information on the chain. In other words, the header information of the last piece of block information on the chain includes hash values of header information of all prior pieces of block information on the chain. Therefore, to determine whether the falsified transaction successfully attacks the ethereum network, i.e., determine whether falsification attack resistance of consensus algorithm of the ethereum network is reliable, it is necessary to view the header information of the last piece of block information on the chain maintained by the preset node, i.e., the "bad node," in the ethereum network, and the header information of the last piece of block information on the chain maintained by the non-set node, i.e., the "normal node," in the ethereum network. In addition, according to consensus algorithm between the preset nodes, i.e., consensus algorithm between the "bad nodes," all preset nodes reach a consensus on a given chain. Therefore, for viewing the last piece of block information on the chain maintained by a preset node, any one of all preset nodes may be selected for viewing. Similarly, for viewing the last piece of block information on the chain maintained by the non-set node, any one of all non-set nodes may be selected for viewing. Therefore, a request for acquiring block information may be sent to any one of all preset nodes in the ethereum network, and any one of all non-set nodes in the ethereum network, to acquire the last piece of block information on the chain maintained by the node. When receiving the last pieces of block information from the preset node and the non-set node respectively, the last piece of block information received from the preset node and the last piece of block information received from the non-set node are correspondingly defined as a first piece of block information and a second piece of block information respectively. Then, whether header information of the first piece of block information is identical to header information of the second piece of block information is determined by comparison. When the header information of the first piece of block information is identical to the header information of the second piece of block information, the chain maintained by the non-set node, i.e., the "normal node," includes a block generated by the falsified transaction. Therefore, the falsified transaction successfully attacking the ethereum network is determined, i.e., the falsification attack resistance of the consensus algorithm of the ethereum network is not reliable. When the header information of the first piece of block information is different from the header information of the second piece of block information, no block is generated by the falsified transaction on the chain maintained by the "normal node." Therefore, the falsified transaction failing to attack the ethereum network is determined, i.e., the falsification attack resistance of the consensus algorithm of the ethereum network is reliable.

In the embodiment of the present disclosure, another approach of determining whether the falsified transaction successfully attacks the ethereum network is sending a transaction information request to any one of all non-set nodes in the ethereum network. The transaction information request includes an identifier of the falsified transaction. When receiving the transaction information request, the non-set node searches for the falsified transaction in a txpool of a present node directly using the identifier of the falsified transaction, directly returns information of the falsified transaction if the falsified transaction is found, and directly returns a response of failure to find the falsified transaction if failing to find the falsified transaction. That is, after receiving a response message returned by the non-set node, the response message is viewed to determine whether the response message includes the information of the falsified transaction. When the response message includes the information of the falsified transaction, the falsified transaction successfully attacking the ethereum network is determined, i.e., the falsification attack resistance of the consensus algorithm of the ethereum network is not reliable. When the response message does not include the information of the falsified transaction, the falsified transaction failing to attack the ethereum network is determined, i.e., the falsification attack resistance of the consensus algorithm of the ethereum network is reliable.

The embodiment of the present disclosure sends a falsified transaction using a preset node, i.e., a "bad node," thus simulating the effect of falsifying and attacking chain data using the falsified transaction by the "bad node," and then viewing whether the falsified transaction can be accepted by a "normal node," i.e., a non-set node, thereby achieving validating falsification resistance of consensus algorithm in engineering.

Figure 3:
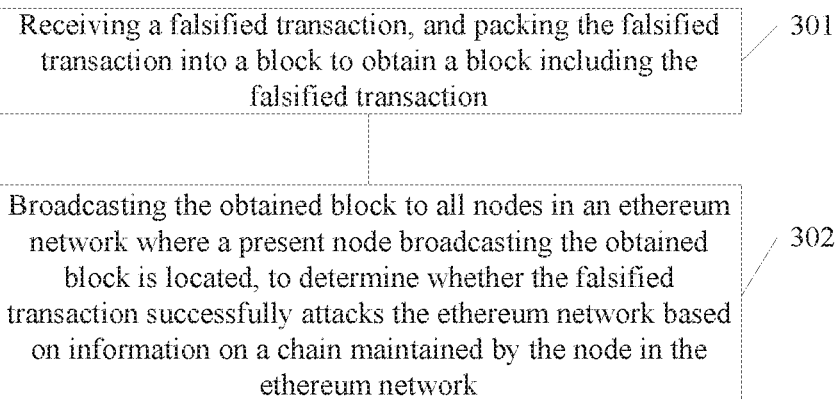
FIG. 3 is a schematic flowchart of another method for processing an ethereum-based falsified transaction according to an embodiment of the present disclosure.

Accordingly, FIG. 3 is a schematic flowchart of a method for processing an ethereum-based falsified transaction according to an embodiment of the present disclosure. As shown in FIG. 3, the method is applied to a preset node, i.e., a "bad node," in an ethereum network. The method includes steps 301 to 302.

Step 301: receiving a falsified transaction, and packing the falsified transaction into a block to obtain a block including the falsified transaction; and Step 302: broadcasting the obtained block to all nodes in an ethereum network where a present node is located, to determine whether the falsified transaction successfully attacks the ethereum network based on information on a chain maintained by a node in the ethereum network.

In order to establish the "bad node" to simulate falsification attack to chain data in the ethereum network, the falsified transaction is received by the preset node in the ethereum network. The preset node in the ethereum network receives the falsified transaction by two approaches: one is all preset nodes in the ethereum network receiving the falsified transaction simultaneously, and the other is one node of all preset nodes in the ethereum network receiving the falsified network, and then the node sending the falsified transaction to other preset nodes in the ethereum network, instead of broadcasting the falsified transaction to a non-set node, i.e., a "normal node," in the ethereum network. The ultimate goal of whichever implementation is to simulate that the falsified transaction is only visible to the preset node, i.e., the "bad node," and is packed into the block to obtain the block including the falsified transaction, and then the block including the falsified transaction is broadcasted to all nodes in the ethereum network of the present node.

Figure 4:
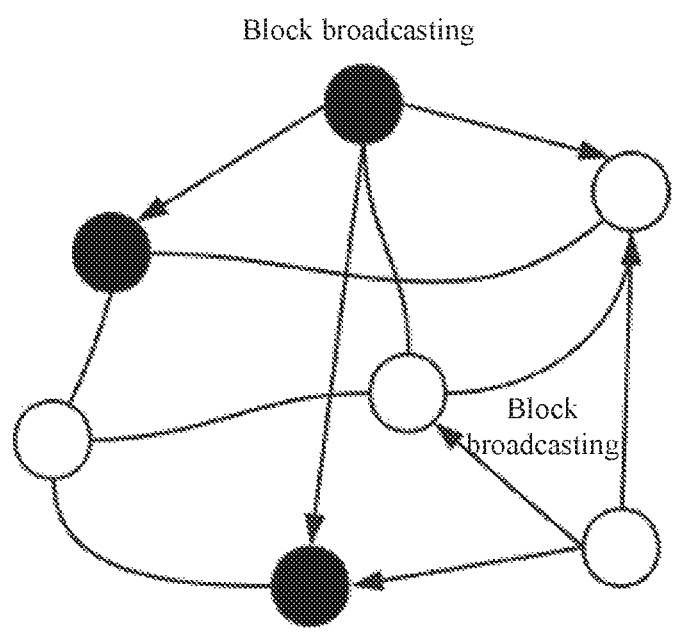
FIG. 4 is a schematic diagram of block propagation of an ethereum network according to an embodiment of the present disclosure.

In addition, since a chain maintained by the "bad node" itself includes the falsified transaction, a block validation strategy used by "normal node" cannot be used. Otherwise, the falsified transaction in the "bad node" will be revoked by the "normal node," because the falsified transaction is invisible to other "normal nodes," and only exists in a block generated by the "bad node." Once the chain of the "bad node" is recombined, the block including the falsified transaction may be discarded, making falsification invalid. Thus, the "bad node," when receiving a block broadcasted to the bad node, further needs to validate a source of the block, to avoid recombination. Specifically, when receiving a block broadcasted to the preset node, the preset node acquires transaction information in the block, and determines whether the transaction information in the block is included in transaction information on a chain maintained by the preset node. The block is discarded, if the transaction information in the block is included in the transaction information on the chain maintained by the preset node. Header signature in the block is acquired, if the transaction information in the block is not included in the transaction information on the chain maintained by the present node. After validating authenticity of the header signature, since the "bad nodes" know each other, whether a node identifier in the header signature is included in a preset node identifier is determined after the header signature is validated to be true. When the node identifier in the header signature is included in the preset node identifier, the block is sourced from another "bad node." Therefore, based on the consensus algorithm between the "bad nodes," the "bad nodes" are guaranteed to reach a consensus on a chain maintained by the "bad nodes," and the block is incorporated onto the chain maintained by the preset node. In an ethereum network shown in FIG. 4, a black node denotes a preset node, i.e., a "bad node," while a white node denotes a non-set node, i.e., a "normal node." As can be seen from FIG. 4, a block including a falsified transaction and generated by the "bad node" is broadcasted to two types of nodes: the "bad node" and the "normal node." When other "bad nodes" receive the block, the block is detected, to ensure that the block is not discarded because of including the falsified transaction.

In the embodiment of the present disclosure, for a preset node, it is necessary to simulate the "bad node," with characteristics including: a received falsified transaction being not broadcasted to the normal node, and the falsified transaction being only generated on the "bad node"; for a received broadcasted block, it being necessary to validate a source of the block, and When the block is validated to be sourced from other preset nodes, the block is incorporated into a chain, to ensure that the block including the falsified transaction is not be discarded.

Functions of such "bad nodes" are implemented based on open source Geth, and two implementation logics are mainly modified: one is a logic of broadcasting transaction in BroadcastTxs, which is modified to broadcasting the falsified transaction only to the preset node, i.e., the "bad node," and not to the "normal node"; and the other is logic for processing NewBlockMsg in handleMsg of ProtocolManager: the "bad node" screens the received broadcasted block, to prevent the block including the falsified transaction from being discarded due to chain recombination.

The above embodiment sends the falsified transaction to a preset node to simulate the effect of broadcasting a block including a falsified transaction by a so-called "bad node," and views whether a "normal node" in an ethereum network includes the falsified transaction generated by the "bad node" to validate the integrity and non-repudiation effect of consensus algorithm of the ethereum network of the "bad node" for chain data. If the falsified transaction can be queried from the "normal node," then the "bad node" and the "normal node" reach a consensus on the falsified transaction, and the falsified transaction generated by the "bad node" is accepted by the "normal node," such that the "bad node" successfully attacks the chain data, i.e., the falsification attack resistance of the consensus algorithm of the ethereum network is not reliable; otherwise, the "normal node" does not accept the falsified transaction generated by the "bad node", and the attack fails, i.e., the falsification attack resistance of the consensus algorithm of the ethereum network is reliable.

Figure 5:
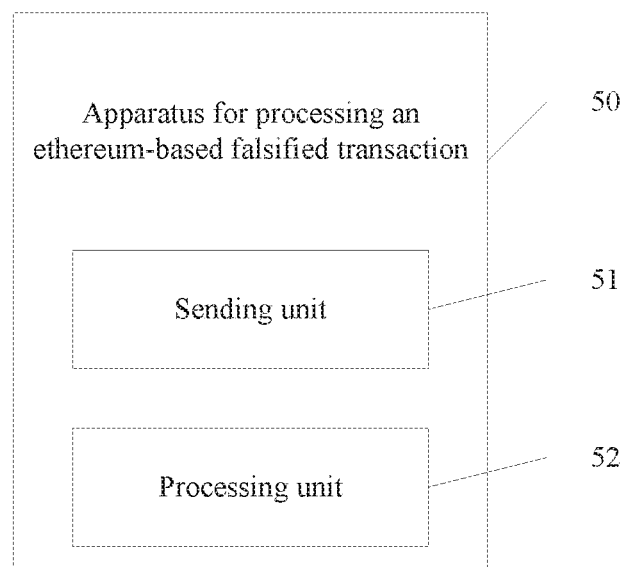
FIG. 5 is a schematic structural diagram of an apparatus for processing an ethereum-based falsified transaction according to an embodiment of the present disclosure.

FIG. 5 is a schematic structural diagram of an apparatus for processing an ethereum-based falsified transaction according to an embodiment of the present disclosure. As shown in FIG. 5, the apparatus 50 includes: a sending unit 51 configured to send a falsified transaction to a preset node in an ethereum network, such that the preset node broadcasts a block including the falsified transaction to all nodes in the ethereum network; and a processing unit 52 configured to determine whether the falsified transaction successfully attacks the ethereum network based on information on a chain maintained by the node in the ethereum network.

Further, the sending unit is further configured to send requests for acquiring block information to the preset node and a non-set node in the ethereum network respectively, the requests for acquiring block information being configured for acquiring a last piece of block information on the chain maintained by the node; as shown in FIG. 6, the apparatus further includes: a receiving unit 61 configured to receive a first piece of block information returned by the preset node and a second piece of block information returned by the non-set node; and the processing unit is further configured to compare header information of the first piece of block information and header information of the second piece of block information to determine whether header information of the first piece of block information is identical to header information of the second piece of block information; determine the falsified transaction successfully attacking the ethereum network, when the header information of the first piece of block information is identical to the header information of the second piece of block information; and determine the falsified transaction failing to attack the ethereum network, when the header information of the first piece of block information is different from the header information of the second piece of block information.

In another embodiment of the present disclosure, the sending unit is further configured to send a transaction information request to the non-set node in the ethereum network, the transaction information request including an identifier of the falsified transaction; the receiving unit is configured to receive a response message returned by the non-set node; and the processing unit is further configured to view whether the response message includes information of the falsified transaction; determine the falsified transaction successfully attacking the ethereum network, when the response message includes the information of the falsified transaction; and determine the falsified transaction failing to attack the ethereum network, when the response message does not include the information of the falsified transaction.

The embodiment of the present disclosure sends a falsified transaction using a preset node, i.e., a "bad node," thus simulating the effect of falsifying and attacking chain data using the falsified transaction by the "bad node," and then viewing whether the falsified transaction can be accepted by a "normal node," i.e., a non-set node, thereby achieving validating falsification resistance of consensus algorithm in engineering.

FIG. 7 is a schematic structural diagram of an apparatus for processing an ethereum-based falsified transaction according to an embodiment of the present disclosure. As shown in FIG. 7, the apparatus 70 includes: a receiving unit 71 configured to receive a falsified transaction; a processing unit 72 configured to pack the falsified transaction into a block to obtain a block including the falsified transaction; and a sending unit 73 configured to broadcast the obtained block to all nodes in an ethereum network where a present node receiving the falsified transaction is located, to determine whether the falsified transaction successfully attacks the ethereum network based on information on a chain maintained by the node in the ethereum network.

Further, the sending unit is further configured to broadcast the falsified transaction to a preset node in the ethereum network.

Further, the receiving unit is further configured to receive a block broadcasted to the present node, and acquire transaction information in the block; and the processing unit is further configured to determine whether the transaction information in the block is included in the transaction information on the chain maintained by the present node; discard the block when the transaction information in the block is included in the transaction information on the chain maintained by the present node; acquire header signature in the block when the transaction information in the block is not included in the transaction information on the chain maintained by the present node; determine whether a node identifier in the header signature is included in a preset node identifier; and incorporate the block onto the chain maintained by the present node, when the node identifier in the header signature is included in the preset node identifier.

The above embodiment sends the falsified transaction to a preset node to simulate the effect of broadcasting a block including a falsified transaction by a so-called "bad node," and views whether a "normal node" in an ethereum network includes the falsified transaction generated by the "bad node" to validate the integrity and non-repudiation effect of consensus algorithm of the ethereum network where the "bad node" is located on chain data. If the falsified transaction can be queried from the "normal node," then the "bad node" and the "normal node" reach a consensus on the falsified transaction, and the falsified transaction generated by the "bad node" is accepted by the "normal node," such that the "bad node" successfully attacks the chain data, i.e., the falsification attack resistance of the consensus algorithm of the ethereum network is not reliable; or otherwise, the "normal node" does not accept the falsified transaction generated by the "bad node", and the attack fails, i.e., the falsification attack resistance of the consensus algorithm of the ethereum network is reliable.

An embodiment of the present disclosure further provides a storage medium, storing an instruction. The instruction, when executed by a computer, causes the computer to execute at least one of the method for processing an ethereum-based falsified transaction according to the embodiment of FIG. 1, or the method for processing an ethereum-based falsified transaction according to the embodiment of FIG. 3.

As will be appreciated by those skilled in the art, the embodiments of the present disclosure may be provided as a method, system, or computer program product. Accordingly, the embodiments of the present disclosure may take the form of an entirely hardware embodiment, an entirely software embodiment, or an embodiment combining software and hardware. Furthermore, the embodiments of the present disclosure may take the form of a computer program product embodied in one or more computer readable storage mediums having computer readable program codes embodied thereon. The computer readable storage medium includes, but is not limited to, a disk memory, a CD-ROM, an optical memory, etc.

The embodiments of the present disclosure are described with reference to the flowcharts and/or block diagrams of the method, device (system), and computer program product according to the embodiments of the present disclosure. It should be understood that each process and/or block in the flow charts and/or block diagrams as well as combinations of processes and/or blocks in the flow charts and/or block diagrams may be implemented by computer program instructions. The computer program instructions may be provided to a processor of a general purpose computer, a special purpose computer, an embedded processor, or other programmable data processing devices to produce a machine, such that the instructions executed via the processor of the computer or other programmable data processing devices achieves an apparatus for implementing the functions specified in one or more processes in the flow charts and/or one or more blocks in the block diagrams.

These computer program instructions may also be stored in a computer readable memory that can direct a computer or other programmable data processing devices to function in a particular manner, such that the instructions stored in the computer readable memory achieves an article of manufacture including an instruction apparatus which implements the functions specified in one or more processes in the flow charts and/or one or more blocks in the block diagrams.

The computer program instructions may also be loaded onto a computer or other programmable data processing devices, to cause a series of operational steps to be performed on the computer or other programmable devices, to produce a computer implemented process, such that the instructions executed on the computer or other programmable devices provide steps for implementing the functions specified in one or more processes in the flow charts and/or one or more blocks in the block diagrams.

In a typical configuration, the computing device includes one or more processors (CPU), an input/output interface, a network interface, and an internal memory.

The memory may include forms, such as a volatile memory, a random access memory (RAM), and/or a nonvolatile memory, e.g., a read only memory (ROM) or a flash RAM, in a computer readable medium. The memory is an example of the computer readable medium.

The computer readable medium includes volatile/nonvolatile media and removable/non-removable media that can achieve information storage by any method or technology. The information may be a computer readable instruction, a data structure, a program module, or other data. Examples of the computer storage medium include, but are not limited to, a phase-change random access memory (PRAM), a static random access memory (SRAM), a dynamic random access memory (DRAM), a random access memory (RAM) of other type, a read only memory (ROM), an electrically erasable programmable read only memory (EEPROM), a flash RAM or other internal memory technology, a compact disc read only memory (CD-ROM), a digital versatile disc (DVD) or other optical storage, a magnetic cassette tape, and a magnetic tape or magnetic disk storage or other magnetic storage device, or any other non-transmission medium, which can be configured to store information that can be accessed by the computing device. As defined herein, the computer readable medium excludes transitory media, e.g., a modulated data signal or carrier wave.

It should be further noted that the terms such as "comprising", "including" or any other variations thereof are meant to cover the non-exclusive inclusions, such that the process, method, commodity, or apparatus that includes a series of elements not only includes those elements, but also includes other elements that are not explicitly listed, or further includes elements that already existed in such process, method, commodity, or apparatus. In the circumstance without more constraints, an element defined by the phrase "comprising a . . . " does not preclude any other similar elements from existing in the process, method, commodity, or device that includes the element.

As will be appreciated by those skilled in the art, the embodiments of the present disclosure may be provided as a method, system, or computer program product. Accordingly, the embodiments of the present disclosure may take the form of an entirely hardware embodiment, an entirely software embodiment, or an embodiment combining software and hardware. Furthermore, the embodiments of the present disclosure may take the form of a computer program product embodied in one or more computer readable storage mediums having computer readable program codes embodied thereon. The computer readable storage medium includes, but is not limited to, a disk memory, a CD-ROM, an optical memory, etc.

The above is only embodiments of the present disclosure, and is not intended to limit the present disclosure. For those skilled in the art, the present disclosure may have various modifications and alterations. Any modification, equivalent replacement, improvement, and the like made within the spirit and principles of the present disclosure should be included within the scope of appended claims of the present disclosure.

What is claimed is:

1. A method for processing an ethereum-based falsified transaction, the method comprising:
   sending a falsified transaction to a preset node in an ethereum network, such that the preset node broadcasts a block including the falsified transaction to all nodes in the ethereum network; and
   determining whether the falsified transaction successfully attacks the ethereum network based on information on a chain maintained by the node in the ethereum network.

2. The method according to claim 1, wherein the determining whether the falsified transaction successfully attacks the ethereum network based on information on a chain maintained by the node in the ethereum network comprises:
   sending requests for acquiring block information to the preset node and a non-set node in the ethereum network respectively, the requests for acquiring block information being configured for acquiring a last piece of block information on the chain maintained by the node;
   receiving a first piece of block information returned by the preset node and a second piece of block information returned by the non-set node, and comparing header information of the first piece of block information with header information of the second piece of block information to determine whether the header information of the first piece of block information is identical to the header information of the second piece of block information;
   determining the falsified transaction successfully attacking the ethereum network, when the header information of the first piece of block information is identical to the header information of the second piece of block information; and determining the falsified transaction failing to attack the ethereum network, when the header information of the first piece of block information is different from the header information of the second piece of block information.

3. The method according to claim 1, wherein the determining whether the falsified transaction successfully attacks the ethereum network based on information on a chain maintained by the node in the ethereum network comprises:

sending a transaction information request to the non-set node in the ethereum network, the transaction information request comprising an identifier of the falsified transaction;

receiving a response message returned by the non-set node, and viewing whether the response message includes information of the falsified transaction;

determining the falsified transaction successfully attacking the ethereum network, when the response message includes the information of the falsified transaction; and determining the falsified transaction failing to attack the ethereum network, when the response message does not include the information of the falsified transaction.

4. An apparatus for processing an ethereum-based falsified transaction, the apparatus comprising:

at least one processor; and a memory storing instructions, wherein the instructions when executed by the at least one processor, cause the at least one processor to perform operations, the operations comprising:

sending a falsified transaction to a preset node in an ethereum network, such that the preset node broadcasts a block including the falsified transaction to all nodes in the ethereum network; and determining whether the falsified transaction successfully attacks the ethereum network based on information on a chain maintained by the node in the ethereum network.

5. The apparatus according to claim 4, wherein the determining whether the falsified transaction successfully attacks the ethereum network based on information on a chain maintained by the node in the ethereum network comprises sending requests for acquiring block information to the preset node and a non-set node in the ethereum network respectively, the requests for acquiring block information being configured for acquiring a last piece of block information on the chain maintained by the node;

receiving a first piece of block information returned by the preset node and a second piece of block information returned by the non-set node; and comparing header information of the first piece of block information with header information of the second piece of block information to determine whether the header information of the first piece of block information is identical to the header information of the second piece of block information;

determining the falsified transaction successfully attacking the ethereum network, when the header information of the first piece of block information is identical to the header information of the second piece of block information; and determining the falsified transaction failing to attack the ethereum network, when the header information of the first piece of block information is different from the header information of the second piece of block information.

6. The apparatus according to claim 4, wherein the determining whether the falsified transaction successfully attacks the ethereum network based on information on a chain maintained by the node in the ethereum network comprises:

sending a transaction information request to the non-set node in the ethereum network, the transaction information request comprising an identifier of the falsified transaction;

receiving a response message returned by the non-set node;

viewing whether the response message includes information of the falsified transaction;

determining the falsified transaction successfully attacking the ethereum network, when the response message includes the information of the falsified transaction; and determining the falsified transaction failing to attack the ethereum network, when the response message does not include the information of the falsified transaction.

7. A non-transitory storage medium, storing an instruction, the instruction, when executed by a processor, causing the processor to execute the method according to claim 1.

* * * * *